US005101921A

United States Patent [19]

West et al.

[11] Patent Number: 5,101,921

[45] Date of Patent: Apr. 7, 1992

[54] TRUCK HOOD MOTION CONTROL APPARATUS

[75] Inventors: Kenton L. West; Nasser Fahr, both of Fort Wayne, Ind.

[73] Assignee: Navistar International Transportation Corp., Chicago, Ill.

[21] Appl. No.: 610,482

[22] Filed: Nov. 7, 1990

[51] Int. Cl.[5] .......... B62D 25/12

[52] U.S. Cl. .......... 180/69.21; 16/370; 180/89.17

[58] Field of Search .......... 16/368, 370; 49/254, 49/483; 180/69.21, 69.22, 69.23, 89.17, 89.18, 69.2

[56] References Cited

U.S. PATENT DOCUMENTS

| | | | |
|---|---|---|---|
| 1,412,109 | 4/1922 | Evans, Jr. | 16/370 |
| 1,489,633 | 4/1924 | Evans, Jr. | 16/370 |
| 2,931,452 | 5/1960 | Mackie | 180/69 |
| 3,767,001 | 10/1973 | Chupick | 180/69 |
| 4,206,944 | 6/1980 | Kumagai et al. | 296/76 |
| 4,382,312 | 5/1983 | Liggett et al. | 16/365 |
| 4,566,552 | 1/1986 | Hoffman et al. | 180/69.21 |
| 4,853,985 | 8/1989 | Perry | 180/69.21 X |

FOREIGN PATENT DOCUMENTS

| | | | |
|---|---|---|---|
| 896963 | 3/1945 | France | 180/69.21 |
| 622046 | 4/1949 | United Kingdom | 180/69.21 |

*Primary Examiner*—Andres Kashnikow
*Assistant Examiner*—Michael Mar
*Attorney, Agent, or Firm*—Dennis K. Sullivan

[57] ABSTRACT

A hood assembly for a conventional truck includes structure for maintaining alignment of the hood relative to the cab during operation of the truck, structure for sealing the gap between the hood and a cowl of the truck, and a four bar linkage hood motion control apparatus, with or without a secondary pivot which can be activated to increase the degree of forward tilt of the hood. The four bar linkage provides for easy forward tilting of the hood assembly by causing horizontal movement of the hood in the first phase of the opening motion followed by pivoting of the hood toward a vertical position to allow access to an engine compartment therebeneath. The linkage is connected to the hood adjacent the center of gravity thereof and provides a truck tilt hood assembly which is significantly decreased in weight.

11 Claims, 6 Drawing Sheets

3/6

TRUCK HOOD MOTION CONTROL APPARATUS

CROSS REFERENCE TO RELATED APPLICATION

This application is related to U.S. patent application Ser. No. 07/610,483 filed concurrently herewith by Kenton L. West, Larry N. Reynard, and David H. Thomas and assigned to the assignee hereof.

BACKGROUND OF THE INVENTION

The present invention relates to a hood assembly for use on conventional heavy and medium duty trucks of the type wherein the hood opens forwardly from the cab to expose the engine compartment and, more particularly, to a hood motion control apparatus including a four-bar linkage for attaching the hood to the truck chassis, with or without a secondary pivot which can be activated to increase the degree of forward tilt of the hood. The hood motion control apparatus provides the advantage that, once the hood has been moved slightly from its position of engagement with the cowl of the vehicle, only a minimal amount of physical effort will be required on the part of the person tilting the hood to move it to a fully open position, as well as other advantages, such as reduced hood weight and improved hood motion control.

THE PRIOR ART

Hood motion control structures are well known in the heavy duty truck art and generally comprise a pivotal mounting of the hood about a fixed horizontal pivot axis located adjacent the front bumper of the truck. Since a heavy duty truck hood of this type includes the front and sides wall of the engine compartment, as well as the fenders, headlights, and reinforcing members, and thus involve substantial size and weight, it has become necessary with most hoods to provide devices, such as springs and shock absorbers, to control the motion of the hood between the open and closed positions. An example of a typical hood of this type can be found by reference to U.S. Pat. No. 4,566,552 to Hoffman et al. Much of the additional weight beyond the skin necessary to enclose the engine compartment and wheel wells can be attributed to the additional structure required to mount the hood at the lower forward fixed pivot.

In the present invention, the hood is mounted to the vehicle by a four bar linkage which attaches to the hood at a location which is near the hood center of gravity. Thus, the moment force exerted by the center of gravity about the fixed pivot of the prior art is substantially reduced in our invention rendering the additional reinforcement structure unnecessary.

The Mackie U.S. Pat. No. 2,931,452 discloses a portion of a hood of a fork lift vehicle supported by a four bar linkage upon parallel vertical frame members disposed at the end of the vehicle so that the hood is first raised substantially vertically and then is pivoted to a substantially vertical position beyond the end of the vehicle. The hood is provided with top and side portions but has an open end which interfaces with the stationary rear wall and grille structure of the vehicle. The rear wall structure of the vehicle thus, in effect, moves through the rearwardly facing open end of the hood as the hood is pivoted towards a vertical position.

SUMMARY OF THE INVENTION

It is a primary object of the present invention to provide a truck hood motion control apparatus for conventional medium and heavy duty trucks which provides for easy forward opening and tilting of the hood assembly to allow access to the engine compartment therebeneath.

It is a further object of the invention to provide a truck hood motion control apparatus which mounts to the hood near the center of gravity thereof thereby significantly reducing the required reinforcing structure in the hood and accordingly the weight of the hood.

A more specific object of the invention is to provide a four bar linkage for attaching the hood to the truck chassis to thereby provide improved control of the motion of the hood during the opening and closing process.

These and other objects of the invention as will become apparent hereinafter are specifically met in a truck hood motion control apparatus for use with a hood of the type which opens forwardly of the truck to expose the engine compartment comprising a pair of four bar nonparallel linkages interconnecting respectively the left and right sides of the hood with the left and right sides of the chassis to cause the hood, when manually pulled from the front, to first move in a horizontal orientation forwardly away from the cab, thereby releasing the connections between hood and cowl, and then to pivot to a vertical orientation to expose the engine compartment, the linkage optionally including a secondary pivot which can be activated to increase the degree of forward tipping of the hood. The pivotal connections of the linkage to the hood are disposed adjacent the center of gravity thereof while the pivotal connections to the frame are located at the forward end of the frame rails.

The hood motion control apparatus thus provides for easy forward opening of the hood assembly simply by horizontal manipulation of the center of gravity and pivoting to allow access to an engine compartment therebeneath. The pivotal connections of the left and right linkages further produce the advantage that racking loads present in the frame of the truck due to operation on rough terrain, or simply from hitting a deep pot hole at 55 mph, will not be transmitted to the hood as they would be in prior art trucks wherein the hood is mounted to the frame rails by a fixed pivot.

BRIEF DESCRIPTION OF THE DRAWINGS

Other objects and advantages of the invention will become more apparent upon a perusal of the detailed description thereof and upon reference to the drawings, in which.

DESCRIPTION OF THE PREFERRED EMBODIMENT

Figure 1:
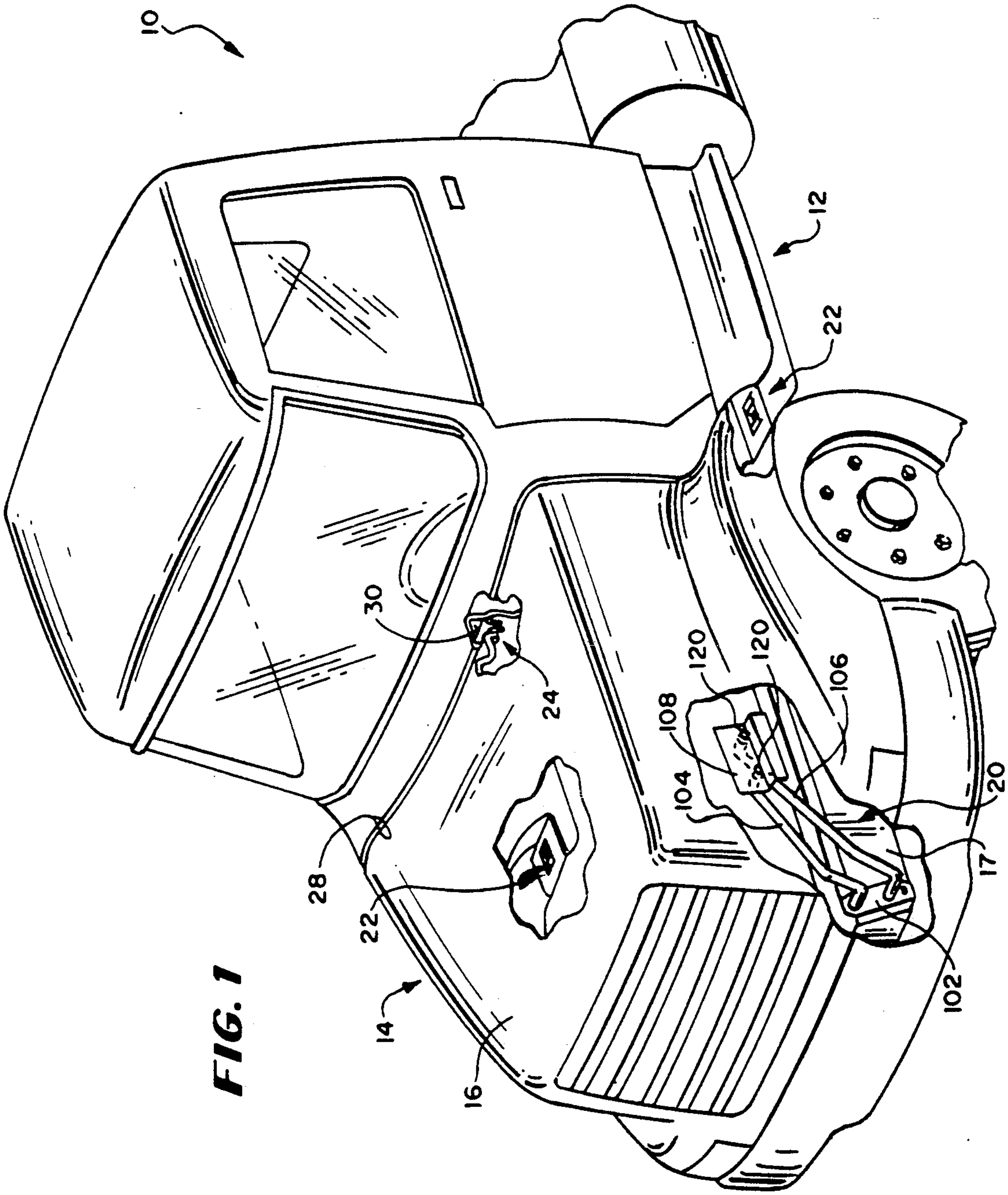
FIG. 1 and FIG. 2 are left front perspective views of a truck incorporating the novel truck hood motion control apparatus of the present invention, with the hood thereof being respectively in the closed and open positions and having portions broken away to show the internal structures of the apparatus.
Figure 2:
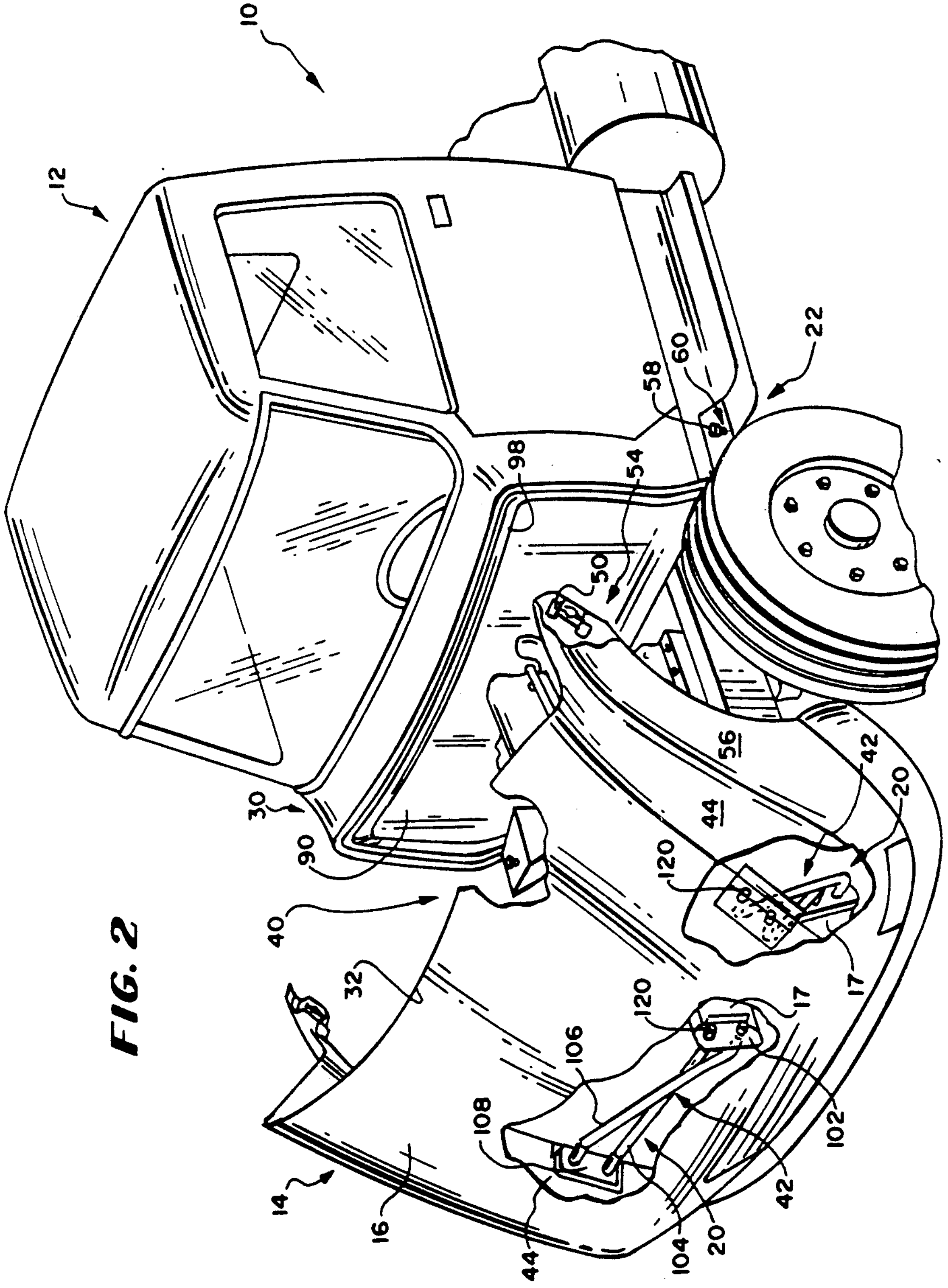
Figure 3:
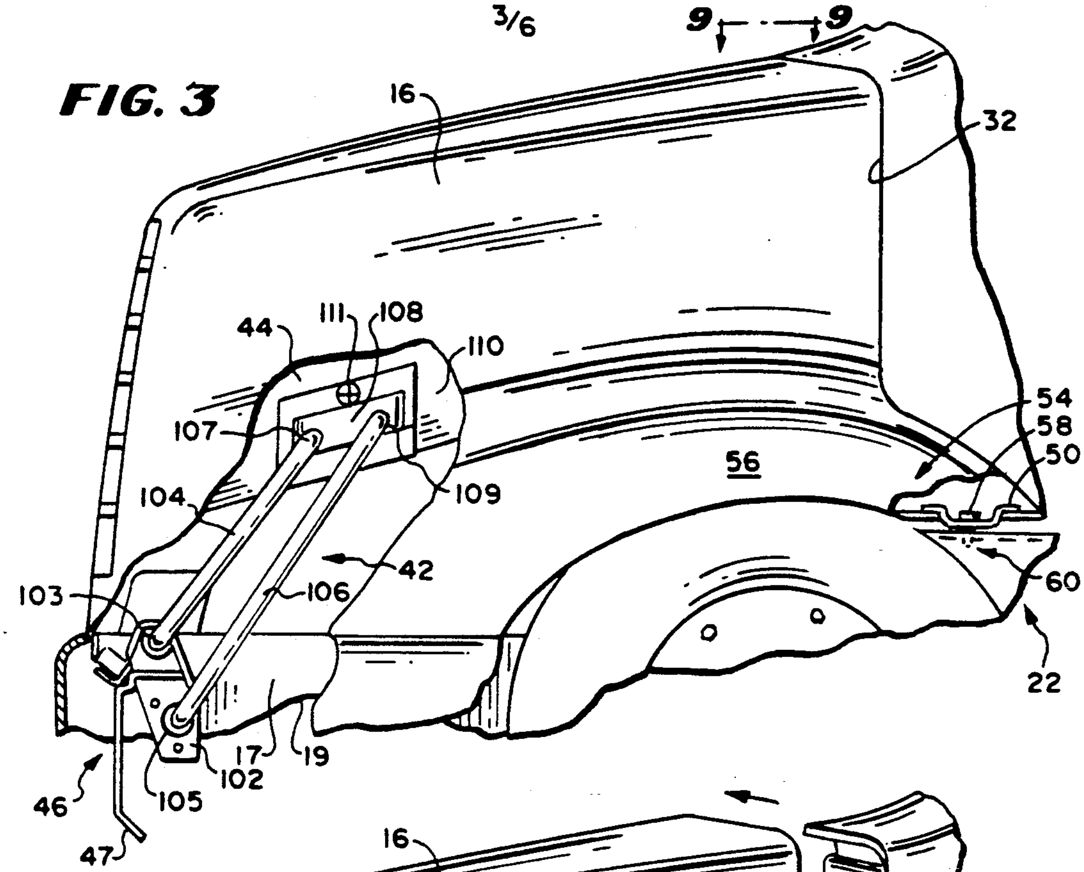
FIGS. 3–6 are side views of the truck hood of FIG. 1 in various positions to illustrate the range of motion, the hood having portions broken away to show the hood motion control linkage system.
Figure 4:
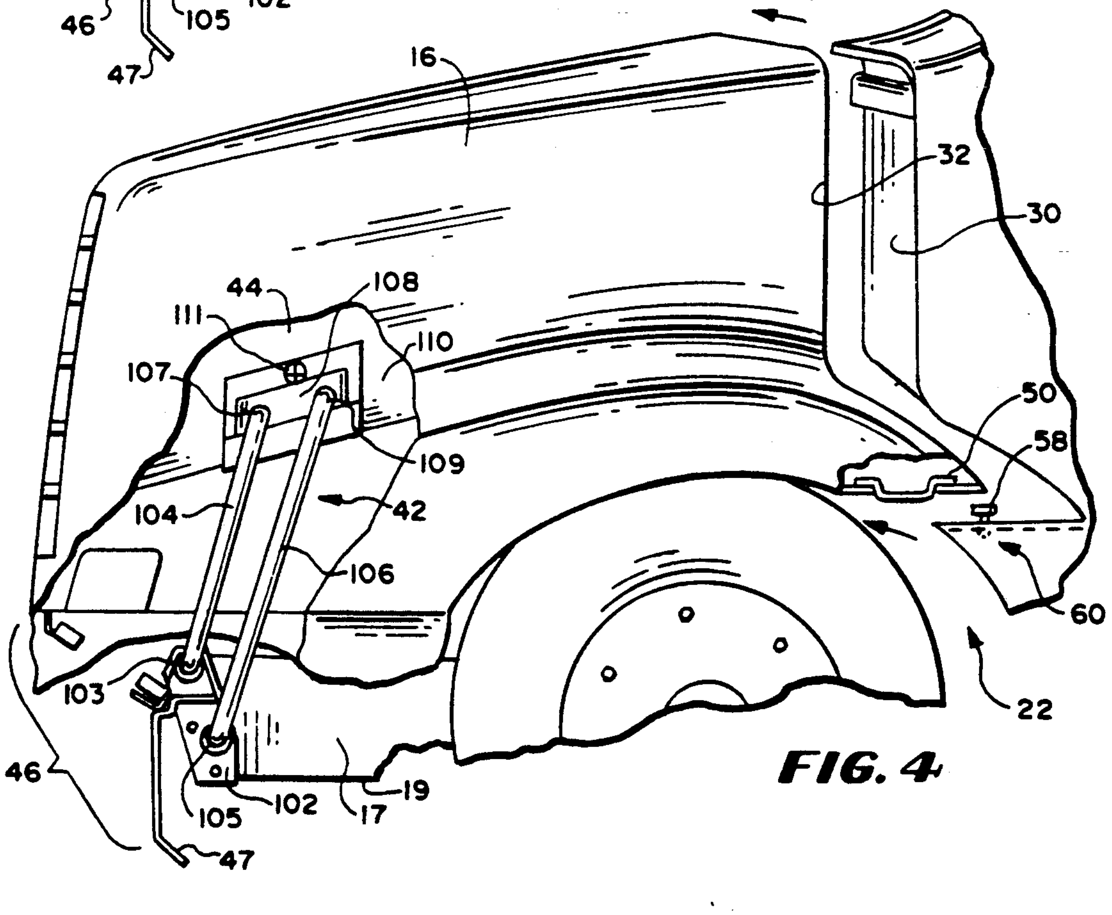

Referring now to the drawings in greater detail, there is illustrated in FIGS. 1 and 2 a section of a truck 10 including a cab 12 and a hood assembly 14. The truck 10 is of the conventional type having an engine compartment defined by a hood disposed forwardly of the truck cab.

In this respect, the hood assembly 14 of the truck 10 is designed to open forwardly and tilt away from the cab 12, as is known in the art. A truck hood is unique compared to automobiles because it functions as hood, fenders, grille, headlight support, and front panel all molded in a single unit. Because of all these functions, as well as the larger size of the vehicle and the vehicle engine, a significant amount of effort on the part of one trying to open a truck hood is required to get the hood to, release from a latched, running position thereof to a substantially upright open position thereof.

To overcome this requirement, the hood assembly 14 of the present invention incorporates a truck hood 16 mounted to a vehicle chassis 17 by a unique hood motion control apparatus 20. The hood assembly 14 further includes alignment means 22 for aligning the hood and cab in the closed position and a seal means 24 disposed in the gap 28 between the hood and the cowl 30 of cab 12 which may be enlarged to accommodate relative motion between the hood and the cab which may be independently suspended from the frame of the truck.

Turning now to FIG. 2, a cowl engaging end 32 of the hood assembly 14 is shown being tilted forwardly upwardly away from the cowl 30, and, in this particular embodiment, the hood motion control apparatus 20 has been designed to allow the hood 16 to open and tilt far enough forwardly to allow a mechanic, for example, to lift a forwardly mounted radiator (not shown) straight up and out of the engine compartment 40 defined within confines of the hood assembly 14.

As defined above, the hood motion control apparatus 20 by means of which the hood assembly 14 is attached to the truck chassis 17 is realized by the provision of two laterally positioned four bar nonparallel linkages 42, each linkage 42 being mounted to and between each side wall 44 of the hood 16 and the chassis 17, with each four bar linkage 42 being a mirror image of the other when viewed about the longitudinal axis of the hood 16. For the sake of simplicity, the operation and structure of a single four bar linkage 42 will be detailed below.

Viewing primarily FIGS. 3–6, the four bar linkage 42 includes a first tilt bracket 102 mounted at the forward end of the frame rail 19 of chassis 17, the bracket 102 preferably being integral with the support means for the bumper 47 which is conventionally attached to the forward end of the frame rails 19. Two bars 104 and 106 are pivotally mounted about transverse axes at 103 and 105 respectively in bracket 102 and have laterally offset intermediate portions which extend angularly rearwardly upwardly to transversely pivotal mounts 107, 109 in a second hood mounted bracket 108 attached to or designed into each side hood reinforcement 110. The transverse pivotal mounts 107, 109 are located adjacently below and straddle, in the fore-and-aft direction, the center of gravity 111 of the hood 16. The upper or forwardmost bar 104 is substantially shorter than the lower rearward bar 106 to produce variations in the type of motion experienced by the hood from nearly rectilinear horizontal motion at the rear end of the hood travel, shown in FIGS. 3 and 4, the bars 104, 106 being nearly parallel in this position so that the radius from the instant center of rotation of the linkage to the hood is nearly infinite, to a pivotal motion experienced by the hood 16 at the forward end of travel, shown in FIGS. 5 and 6, the bars 104, 106 becoming crossed in this position, being permitted to do so by their laterally offset intermediate portions, so that the radius from the instant center of rotation of the linkage to the hood is very short.

Figure 5:
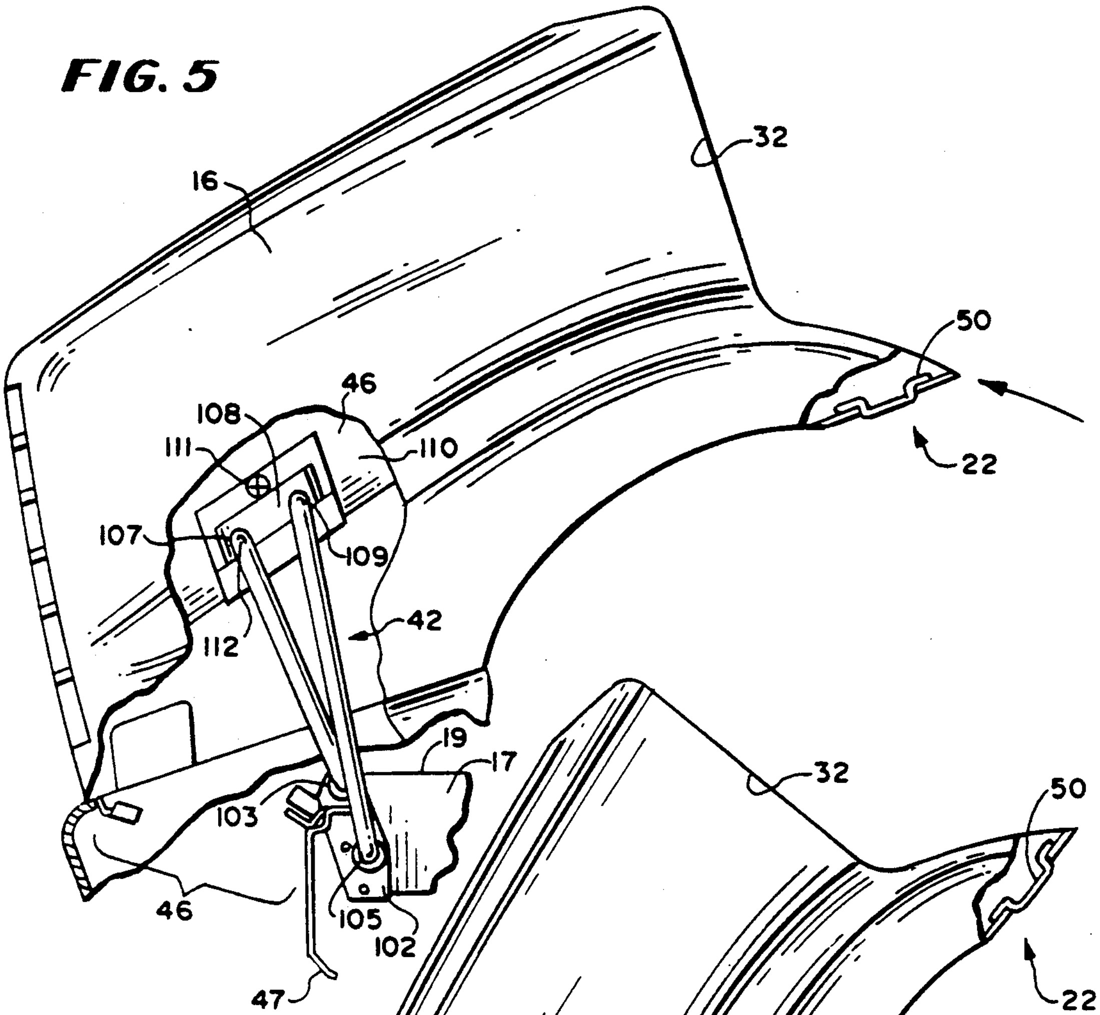
Figure 6:
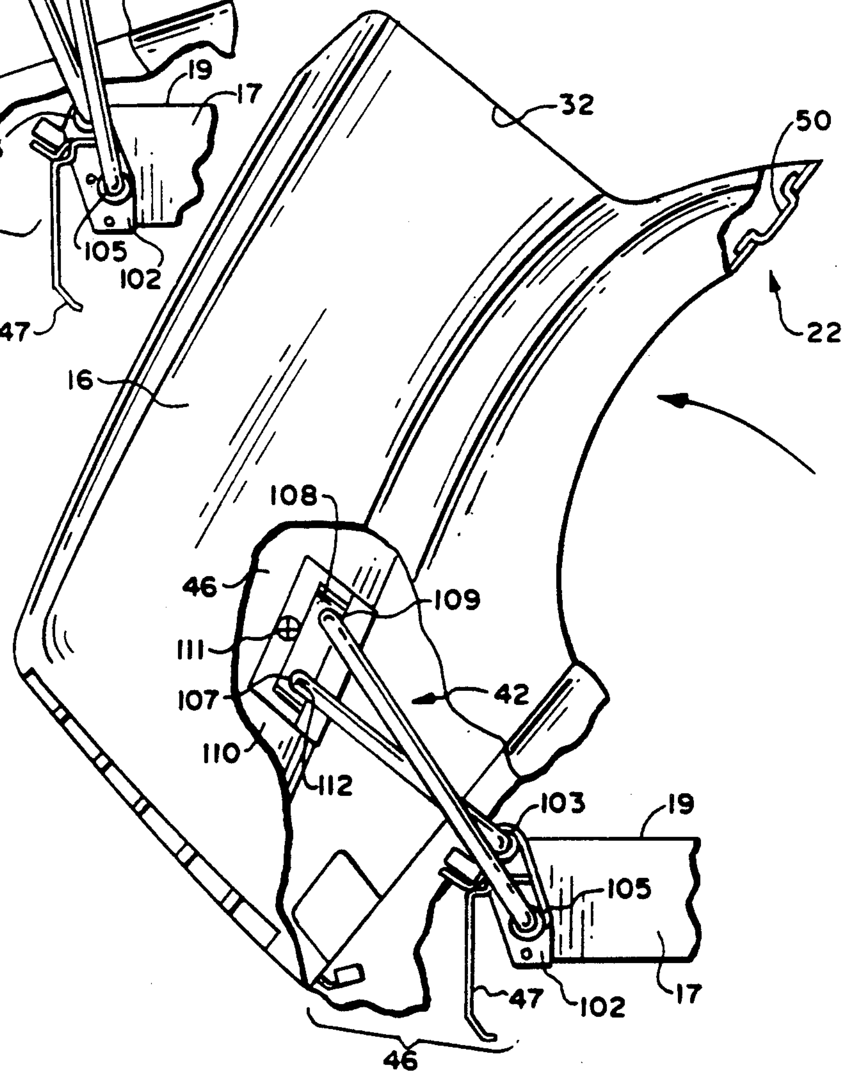

Thus, as the hood 16 is pulled forward by hand, power assist devices being possible but unnecessary, the upper ends of the bars 104 and 106 move first horizontally forwardly and then in forwardly and downwardly directed arcs so that the truck hood 16 first becomes disengaged from the alignment means 22 by sliding horizontally forwardly. Once disengaged, and upon reaching a position where the bars 104 and 106 pass a substantially vertical position, the rear end 32 of the hood 16 will begin to tilt upwardly as the radius of rotation from the instant center of the linkage 42 shortens to a distance less than the length of the bars 104, 106 as shown in FIGS. 5 and 6. The practical effect of this motion is that the center of gravity 111 of the hood moves substantially horizontally with very little vertical movement thereof until the center of gravity passes forwardly of the instant center of the linkage after which it moves slightly forwardly and downwardly as the hood pivots. Thus, because the center of gravity is not lifted, as in conventional hoods, little physical effort is required to open the hood beyond that necessary to overcome the friction in the pivot joints.

Figure 10:
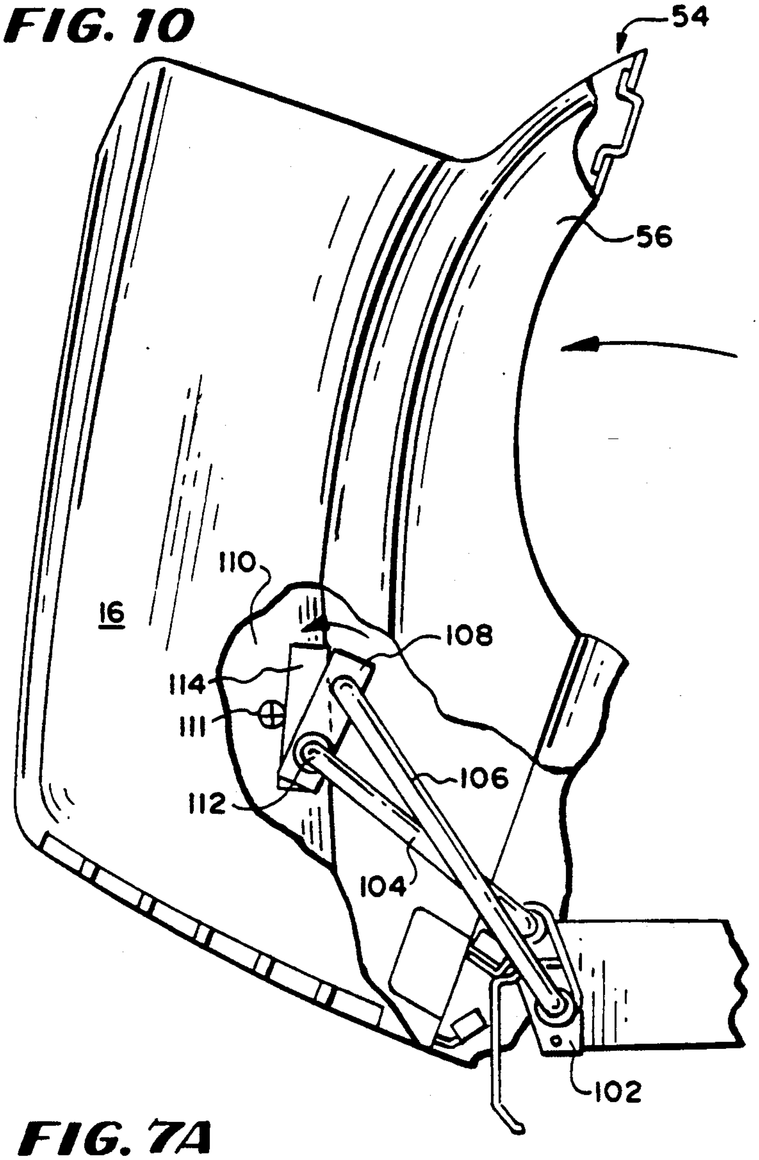
FIG. 10 is a side view of a second embodiment of the truck hood motion control apparatus of the invention incorporating a secondary linkage to allow the hood to tilt forwardly beyond the limits of the primary linkage to a substantially upright position thereof.

It will be realized that such tilting of the hood 16 will reach a position slightly shy of vertical with the forward swing of the hood being stopped when the upper portions of the bars 104 and 106 interfere or by other motion limiting means. However, vertical positioning of the hood may be attained, if desired, utilizing slightly modified second embodiment of the hood motion control apparatus 20 described in FIG. 10.

In this embodiment, a secondary bracket 114 is mounted to the hood reinforcement 110 and bracket 108, to which the bars 104, 106 remain pivotally attached, is pivotally mounted to bracket 114 in overlay relation therewith for slidable rotation relative thereto about pivot point 112, the bracket 114 slidably disengaging from bracket 108 to permit the hood 16 to continue to be rotated forwardly to a vertical position, a suitable stop means limiting further movement. The bracket 108 may be formed from angle iron extending inwardly across a lower edge to provide a stop means to prevent rearward rotation of the secondary bracket 114 and hood beyond the bracket 108.

Inasmuch as the center of gravity 111 of the hood 16 has been previously shifted to the left of the pivot point 112, as shown in FIG. 6, the manual rotation of secondary bracket 114 is easily accomplished by virtue of the weight distribution. Thus, by the further rotation provided by the disengagement of bracket 114 from bracket 108, the hood 16 is allowed to tilt further forward, approaching a vertical alignment.

When closing the hood 16, the four bar linkages 42 provide a unique motion of the hood relative to the cab resulting in an improved means of maintaining the hood in closed position. Since the hood 16 may interact with an independently suspended cab 12 having a significant degree of freedom of movement relative to the hood 16, it is desirable to physically isolate the hood 16 from the cab 12, in order to minimize potential damage to the hood while optimizing the natural frequency of the total cab system. Thus, the rubber tie-downs currently used in conventional trucks to tie the hood 16 and cab 12 into a one-mass system are eliminated and replaced by the hood alignment means 22.

The hood alignment means 22 serves three functions. First, it assists the main latching mechanism 46 in holding down the hood 16 securely. Second, it permits the hood 16 to follow fore-and-aft pitching motions of the cab 12 which may result from an independent suspension by simply moving up or down, thereby removing the fore-and-aft pitch effects which would be transferred to the hood 16 in a conventional tie-down system. Finally, it simplifies adjustment of the hood assembly 14 during initial assembly of the truck.

As best illustrated in FIGS. *7a*, *7b*, and 8, the hood alignment means 22 comprises a bracket 50 which is mounted to a bottom surface 52 of a rear end portion 54 of a fender formation 56 of the truck hood 16. This bracket 50 includes a planar lower flange 51 disposed beneath and parallel to the bottom hood surface 52 to engage and interlock with a selectively positionable head 58 of a pin 60 mounted on a horizontal frame member 62 of the cowl portion 30 of cab 12 with the pin head 58 being slidably engaged in bracket 50 in a horizontal cutout 64 tapering to a smaller dimension that the pin head 58 and a vertical cutout 66 larger than the pin head 58 provided for in the flange 51 thereof.

To mount the pin 60 on the frame member 62, one simply slides a threaded depending base portion 68 of the pin 60 into a bore 70 provided for same in the frame member 62 and secures same thereto with suitable means, such as weld nut 72 attached to the lower side of frame member 62, which may also be used to position the head 58 of the pin 60 at a predetermined height above the frame member 62. It will be understood that two such bracket 50 and pin 60 combinations are provided, one being disposed on each side of the hood assembly 14.

In this respect, with the hood 16 lowered and held in a desired position, an installer simply reaches under each fender formation 56 and adjusts the position of the pin 60 in nut 72 to effectively adjust the vertical position of the pin head 58 of the alignment means 22 relative to the frame member 62. This relative positioning in turn controls the range of vertical motion in the hood-closed position of the rear end 32 of the hood assembly 14 by virtue of the engagement of the bracket 50 around the head 58 of the pin 60.

Figure 7A:
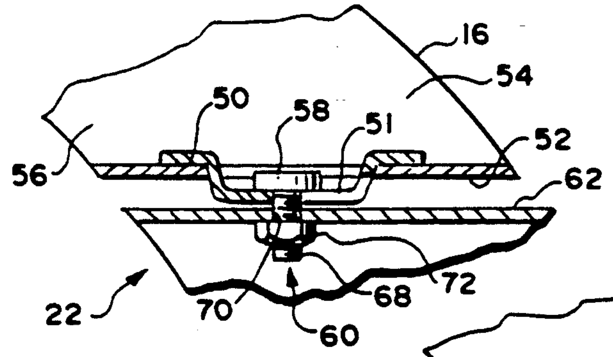
FIG. 7A and 7B are a side views of hood alignment means provided for the hood of FIG. 1 showing same respectively in engaged and disengaged conditions.
Figure 7B:
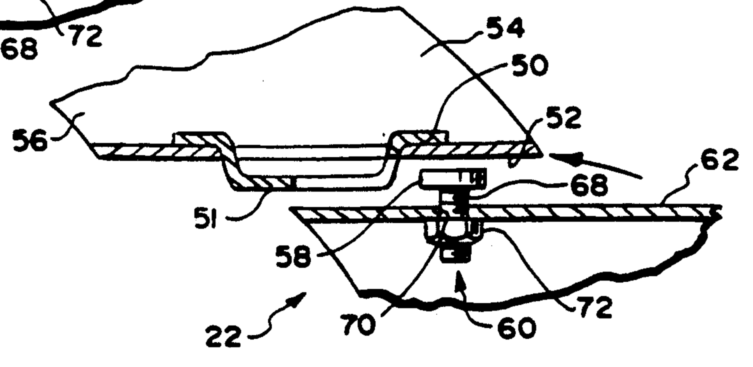
Figure 8:
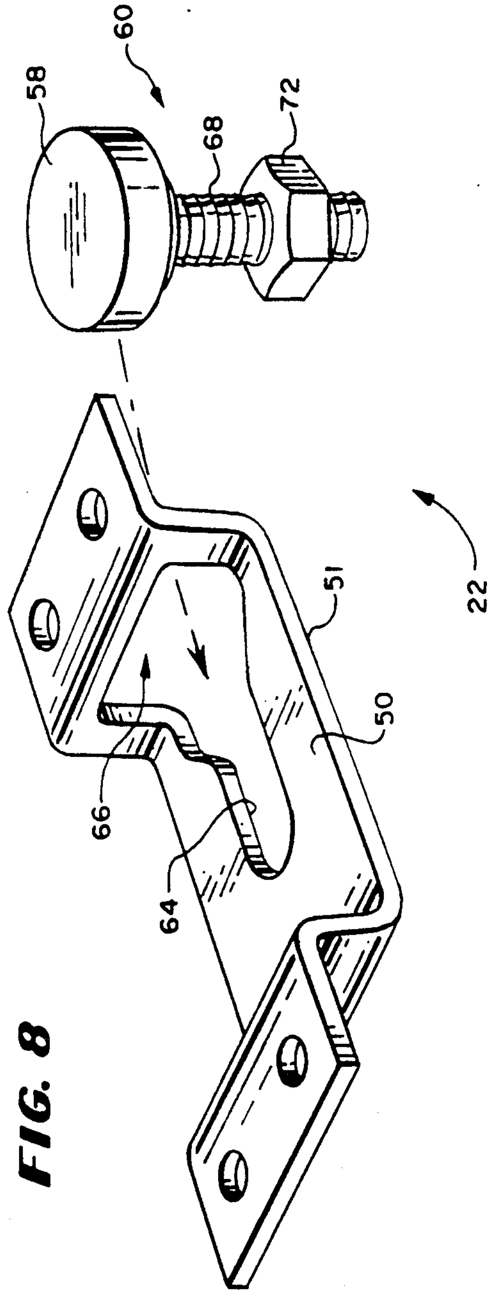
FIG. 8 is an enlarged perspective view of a portion of the hood alignment means of FIGS. 7*a* and 7*b*.

In operation of the alignment means 22, as the hood 16 is moved toward a closed position, its motion being controlled by the four bar linkages 42, the cowl engaging rear end edge 32 of the hood moves horizontally rearwardly from a position just prior to closing shown in FIG. 7B to the closed position shown in FIG. 7A with the vertical cutout 66 of the bracket flange 51 allowing the head 58 of the positioning pin 60 to pass therethrough so that the pin body 68 enters the horizontal cutout 64 to trap the pin head 58 within the bracket 50 as shown.

Alternatively, when the hood 16 is being opened, the hood 16 first slides horizontally forward allowing the head 58 of the pin 60 to disengage itself from within the bracket 50 prior to the hood 16 beginning to pivot toward the open position thereof.

Figure 9:
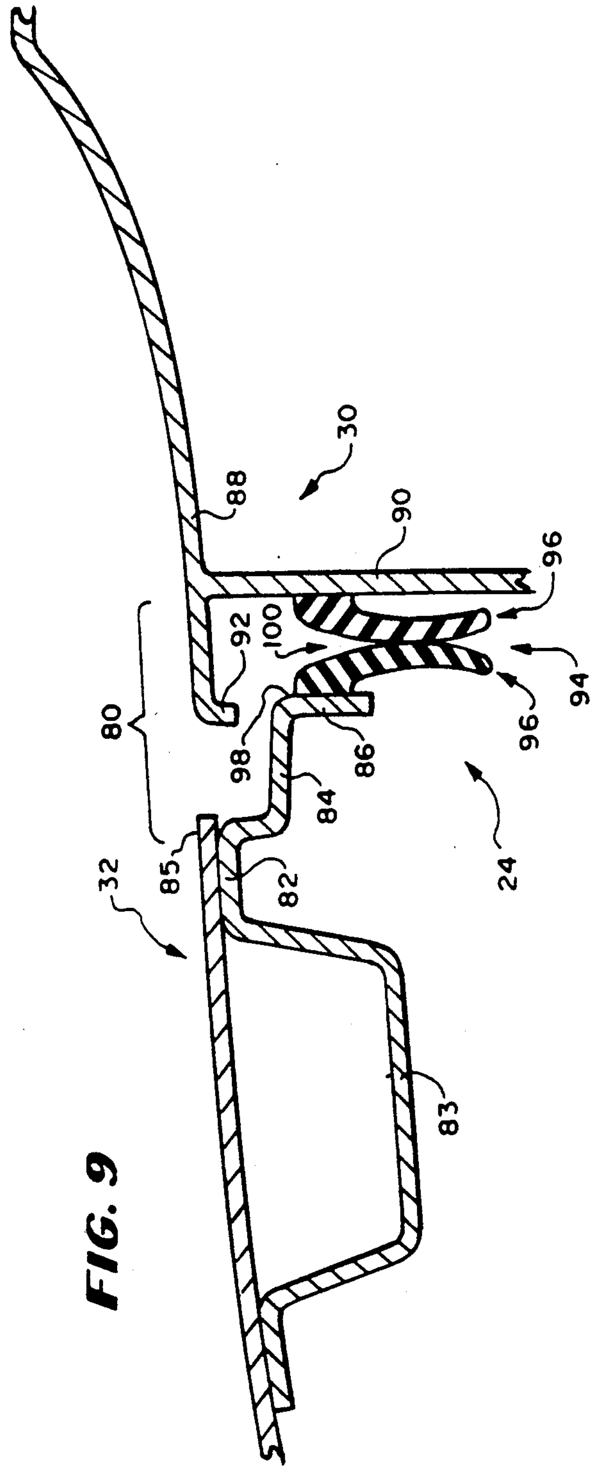
FIG. 9 is a cross-section, taken along the line 9—9 of FIG. 3, of the interface between the hood of FIG. 1 and the cab cowl showing a seal assembly therefor.

Turning now to FIG. 9 and a study of the hood-cowl interface, the hood assembly 14 may be used with a vehicle cab 12 which includes an active suspension (not shown), allowing the cab 12 to have a significant degree of movement relative to the hood 16. To accommodate this movement, the hood 16 must be separated from the cowl 30 by a gap 80 which may be rather large in comparison to the hood-cowl gap of present day vehicles. Thus, the gap 80 must be sealed to provide an actual as well as an aesthetic, visual closure thereof.

To create such closure, a rear flange 82 of a hood transverse rear reinforcement member 83, which traverses the rear end 32 of the hood 16 including the side wall portions, is extended beyond the rear end 85 of the hood 16 to include a downwardly stepped platform 84 directly beneath the gap 80, with the platform 84 terminating in a downwardly depending flange 86. The upper horizontal wall 88 of the cowl 30 continues horizontally outwardly past its point of intersection with the vertical front wall or dash panel 90 of the cowl 30 and terminates in a downwardly directed lip 92 positioned over the stepped horizontal platform 84 of the hood reinforcement member 83 when the hood 16 is in the closed position. This alignment of elements provides for a visual closure of the gap 80 without providing any actual contact between the hood 16 and the cowl thereacross.

The actual gap seal assembly 94 comprises two juxtaposed arcuate elastomeric seals 96, one suspended from a cowl facing surface 98 of the downwardly depending flange 86 of the hood reinforcement member 83 and the other suspended from the vertical cowl wall 90. The seals 96 are provided in the form of convex weatherstrips (FIG. 2), one of which is fixed around the periphery of the vertical cowl wall 90 and the other of which extends completely along the rear hood reinforcement member 83.

The convex abutting surfaces 100 of the seals 96, which are mirror images of one another, are compressed together to form the actual seal across the gap 80. This compression takes place and is maintained upon engagement of the hood alignment means 22.

The primary advantage of the four-bar linkage hood motion control apparatus 20 of the invention is that it provides an alternative location for attaching the tilt mechanism to the hood near the center of gravity thereof. In this respect, the traditional low-forward pivot axis mounting is just that, "a tradition", creating a very high stress situation in the lower front of the hood and in the grill opening. Both metal grill braces and bonded-in hood reinforcements are necessary to compensate for this stress, thereby increasing hood weight and material costs, as well as assembly labor and parts inventory costs. By eliminating these braces and much of the reinforcement, the weight of the hood can be substantially reduced and the center of gravity of the hood significantly lowered resulting in considerably easier operation of the hood assembly 14.

Another advantage of the invention is that it will reduce the cost of manufacture of the hood assembly by reducing the number of parts while providing exceptional serviceability. For example, the tilt bracket 102 is part of the existing bumper mounting extensions attached to the frame rails 19 and the hood mounted tilt bracket 108 may be a part of the hood side reinforcement 110. The remaining parts that are needed for each linkage 42 are the two pivot bars 104 and 106, and four pins 120 (FIGS. 1 and 2) used to pivotally mount the bars 104 and 106 as shown.

Thus, there has been provided, in accordance with the invention, a truck hood motion control apparatus which fully satisfies the objects, aims and advantages set forth above. It is recognized that others may develop variations, alternatives and modifications of the invention after a perusal of the foregoing specification. Accordingly, it is intended to cover all such variations, modifications, and alternatives as may fall within the scope of the appended claims.

What is claimed is:

1. In combination with a conventional truck of the type having a frame, a cab mounted on the frame, an engine compartment forward of said cab, and a hood mounted to said frame for closing said engine compartment, said hood including a front panel portion defining the entire forward wall of the engine compartment including a grille disposed in said panel portion, said hood having a center of gravity and moving away from said cab to a rotated position disposed forwardly of said engine compartment to facilitate access thereto, a hood motion control apparatus comprising:

a four bar linkage interconnecting said frame and said hood including a pair of first and second bars disposed along each side of said hood, each of said first and second bars having a straight portion extending between bent end portions, said first bar having one end portion pivotally mounted to said frame and an opposite end portion pivotally mounted to said hood adjacently forward of the center of gravity thereof, and said second bar having one end portion pivotally mounted to said frame and an opposite end portion effectively pivotally mounted to said hood adjacently rearward of the center of gravity thereof, the straight portions of said first bars forming a first transverse plane extending therebetween and the straight portions of said second bars forming a second transverse plane extending therebetween, said first and second transverse planes being spaced apart when said hood is in a closed position and said first and second transverse planes intersecting each other when said hood is in an opened position, wherein upon said hood being moved forwardly from a closed position to an open position by an externally applied force, said hood first moves in a substantially horizontal orientation and subsequently pivots toward a vertical orientation forward of said engine compartment in said open position.

2. The invention in accordance with claim 1 wherein a tilt bracket is mounted on said frame adjacent the forward end thereof, said bars being pivotally mounted respectively to said bracket for rotation about transverse axes.

3. The invention according to claim 2 wherein said pivotal mounting said first bar is disposed above of said pivotal mounting of said second bar in said bracket.

4. The invention in accordance with claim 2 and said hood including a fore-and-aft extending side reinforcement member, said opposite ends of said bars being mounted thereto.

5. The invention in accordance with claim 2 wherein said hood includes a fore-and-aft extending side reinforcement member and a bracket attached to said reinforcement member, said opposite ends of said bars being pivotally attached to said bracket.

6. The invention in accordance with claim 2 wherein said hood includes a fore-and-aft extending side reinforcement member and a bracket pivotally attached to said reinforcement member to permit pivotal movement of said reinforcement member forwardly away from said bracket, said opposite ends of said bars being pivotally attached to said bracket.

7. The invention in accordance with claim 6 wherein said bracket includes stop means for limiting rearward rotation of said side reinforcement relative thereto.

8. The invention in accordance with claim 6 wherein said four bar linkage is provided at each lateral side of said hood.

9. The invention in accordance with claim 1 wherein each four bar linkage is a mirror image of the other as disposed about a central axis of said hood.

10. The invention in accordance with claim 1 wherein each bar is pivotally connected at one end to a bracket mounted to a bumper support member and pivotally connected at the other end to a hood mounted bracket secured to a side reinforcement member of said hood.

11. The invention in accordance with claim 10 wherein said hood mounted bracket is pivotally mounted to said hood.

* * * * *